United States Patent [19]

Breitschwerdt et al.

[11] 4,222,603

[45] Sep. 16, 1980

[54] MOTOR VEHICLE BODY, ESPECIALLY FOR PASSENGER MOTOR VEHICLES

[75] Inventors: Werner Breitschwerdt, Stuttgart; Hans Götz, Bööblingen; Rudolf Meixner; Rudolf Andres, both of Sindelfingen; Hermann Möller, Aidlingen, all of Fed. Rep. of Germany

[73] Assignee: Daimler-Benz Aktiengesellschaft, Fed. Rep. of Germany

[21] Appl. No.: 848,307

[22] Filed: Nov. 3, 1977

[30] Foreign Application Priority Data

Nov. 11, 1976 [DE] Fed. Rep. of Germany ....... 2651434

[51] Int. Cl.² ............................................. B60J 5/04
[52] U.S. Cl. ...................................... 296/146; 49/483
[58] Field of Search ................. 296/146, 28 R, 28 F, 296/28 H, 151; 49/470, 483, 489

[56] References Cited

U.S. PATENT DOCUMENTS

| 3,726,559 | 4/1973 | Wilfert et al. | 296/146 |
| 4,029,353 | 6/1977 | Barenyi et al. | 296/146 |

*Primary Examiner*—Richard A. Bertsch
*Attorney, Agent, or Firm*—Craig and Antonelli

[57] ABSTRACT

A motor vehicle body, especially for passenger motor vehicles, which is provided with laterally arranged doors and longitudinal bearers disposed therebelow whereby an upper area of the longitudinal bearer projects laterally outwardly beyond the lower area, and the upper area is at least partially covered off by the lower edge of the door or by a sealing profile secured at the lower edge of the door and is thus protected against soiling; the lower edge of the door or the sealing profile secured at the lower edge of the door thereby does not abut the longitudinal bearer but extends at a distance with respect thereto.

10 Claims, 1 Drawing Figure

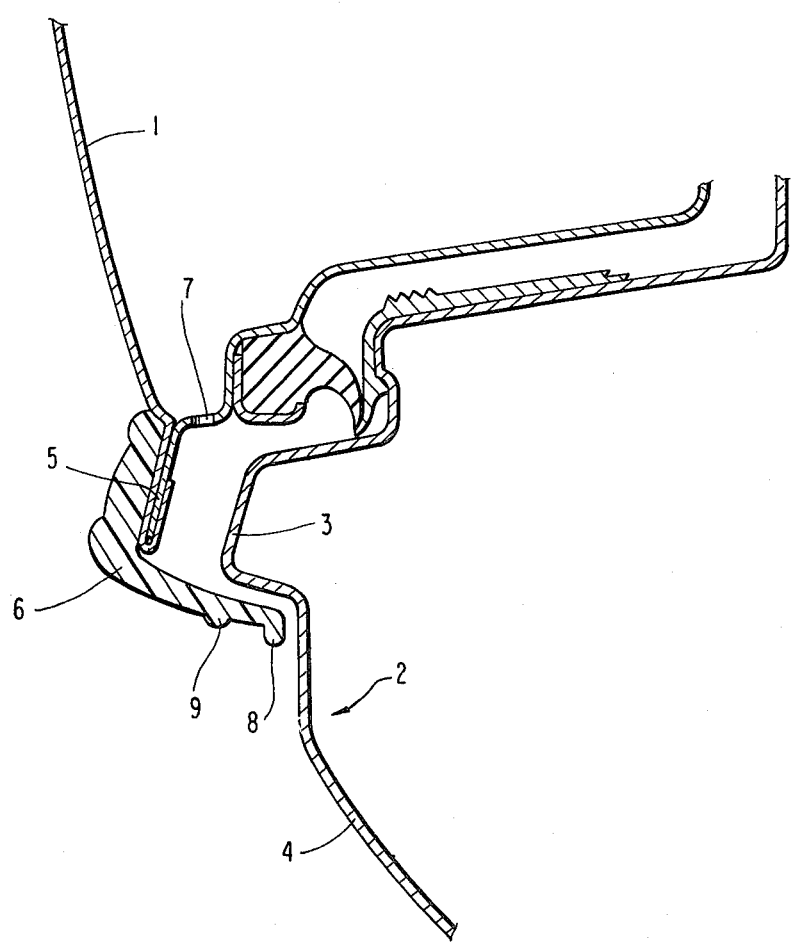

MOTOR VEHICLE BODY, ESPECIALLY FOR PASSENGER MOTOR VEHICLES

The present invention relates to a motor vehicle body, especially for passenger motor vehicles, which is provided with laterally arranged doors and with longitudinal bearers disposed therebelow, whereby an upper area of the longitudinal bearer projects laterally outwardly beyond the lower area and the upper area is at least partially covered by the bottom edge of the doors or by a sealing profile secured at the bottom edge of the doors and is thus protected against soiling.

Such constructions of a motor vehicle body, by means of which a soiling of the vehicle passenger clothing is to be prevented when boarding and leaving the vehicle, are disclosed in the German Pat. No. 934,515 and in the German Offenlegungsschrift No. 2,010,913 (which corresponds to U.S. Pat. No. 3,726,559). However, it is disadvantageous with these prior art constructions that the seals may easily become stuck to the body by freezing thereto during corresponding weather conditions, as a result of which the opening of the doors may be rendered difficult or may be possible at all only with a destruction of the seals. In the case of the construction according to the German Offenlegungsschrift No. 2,010,913, there additionally results the difficulty that a water drainage out of the interior space of the doors is not possible without additional measures.

The present invention is therefore concerned with the task to provide a motor vehicle body of the type described hereinabove, which avoids the aforementioned disadvantages without thereby requiring any additional expenditures in material, installation time or the like.

The underlying problems are solved according to the present invention in that the bottom edge of the door or of the sealing profile does not abut at the longitudinal bearer but extends at a distance with respect to the same.

A preferred embodiment of the present invention resides in that the bottom edge of the door or the sealing profile so engages underneath the bottom side of the projecting area of the longitudinal bearer that a type of labyrinth is formed.

An aimed-at drainage of the water leaving the door interior space is achieved if the sealing profile terminates at its free end in a nose portion—as viewed in cross section.

An effective drainage of the water running off along the outer door surfaces is achieved if a downwardly pointing projection is provided at the bottom side of the sealing profile—as viewed in cross section—ahead of the nose portion, from which the arriving water drips off.

Accordingly, it is an object of the present invention to provide a motor vehicle body especially for passenger motor vehicles which avoids by simple means the aforementioned shortcomings and drawbacks encountered in the prior art.

Another object of the present invention resides in a motor vehicle body which effectively prevents a soiling of the clothes of the vehicle passengers when boarding or leaving the vehicle, yet does not impair the opening of the door during freezing weather conditions.

A further object of the present invention resides in a motor vehicle body, especially for passenger motor vehicles, of the type described above, in which the need for a destruction of the seals is eliminated even during extremely damp and cold weather conditions.

A still further object of the present invention resides in a motor vehicle body which makes possible an effective drainage of water out of the interior space of the doors without requiring additional measures.

A further object of the present invention resides in a motor vehicle body, especially for passenger motor vehicles, which effectively eliminates the disadvantages encountered in the prior art without requiring any additional expenditures in material, assembly or the like.

These and further objects, features and advantages of the present invention will become more apparent from the following description when taken in connection with the accompanying drawing which shows, for purposes of illustration only, one embodiment in accordance with the present invention and wherein:

The single FIGURE is a transverse cross-sectional view through parts of a door and of a longitudinal bearer of a motor vehicle in accordance with the present invention.

Referring now to the single FIGURE of the drawing, the lower portion of a lateral door 1 is shown in cross section in the illustrated embodiment, which is arranged above a longitudinal bearer generally designated by reference numeral 2. The longitudinal bearer 2 includes an upper area 3 which laterally projects outwardly with respect to the lower area 4. This projecting area 3 is protected against soiling by a sealing profile 6 secured at the lower fold 5 of the door 1 in a conventional manner not illustrated in detail, which sealing profile 6, however, does not contact the longitudinal bearer 2 at any place. A type of labyrinth is formed by the illustrated arrangement, and the area 3 of the longitudinal bearer 2 is efffectively protected against soiling. The water leaving the interior space of the door 1 by way of bores 7 runs along the top side of the free leg of the sealing profile 6 and drips off in the downward direction along a nose portion 8. An aimed-at dripping off of water which runs off along the side surfaces of the door is achieved by a projection 9 arranged along the bottom surface of the sealing profile 6 ahead of the nose portion 8.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A motor vehicle body with laterally arranged door means and longitudinal bearer means arranged therebelow, in which an upper area of the longitudinal bearer means projects laterally outwardly beyond the lower area, and the upper area of the longitudinal bearer means is at least partially covered by a cover means and is thus protected against soiling, characterized in that the cover means does not abut at the longitudinal bearer means but extends spaced at a distance from said longitudinal bearer means.

2. A motor vehicle body according to claim 1, characterized in that the cover means is formed by the lower edge of the door means.

3. A motor vehicle body according to claim 1, characterized in that the cover means is formed by a sealing profile means secured at the lower edge of the door means.

4. A motor vehicle body according to claim 1, characterized in that the cover means so extends underneath the bottom side of the projecting area of the longitudinal bearer means that a type of labyrinth is formed.

5. A motor vehicle body according to claim 4, with a sealing profile means secured at the bottom edge of the door means and forming said cover means, characterized in that the sealing profile means terminates at its free end in a nose portion, as viewed in transverse cross section.

6. A motor vehicle body according to claim 5, characterized in that a downwardly pointing projection is provided along the bottom side of the sealing profile means ahead of the nose portion—as viewed in transverse cross section.

7. A motor vehicle body according to claim 1, with a sealing profile means secured at the bottom edge of the door means and forming a part of said cover means, characterized in that the sealing profile means terminates at least near its free end in a nose portion, as viewed in transverse cross section.

8. A motor vehicle body according to claim 7, characterized in that a downwardly pointing projection is provided along the bottom side of the sealing profile means ahead of the nose portion—as viewed in transverse cross section.

9. A motor vehicle body with laterally arranged door means and a longitudinal bearer arranged therebelow, an upper area of said longitudinal bearer projecting outwardly laterally beyond a lower area of the longitudinal bearer, cover means for protecting said upper area against soiling, said cover means partially covering said upper area and means for preventing sticking of said cover means to said longitudinal bearer formed by means mounting said cover to the door means so as to be spaced from said longitudinal bearer.

10. A motor vehicle body according to claim 9, comprising outlet means for enabling drainage of water from interior spaces of said door means, said outlet means including aperture means in said door means communicating exteriorly of said vehicle body via the spacing between said cover means and said longitudinal bearer.

* * * * *